United States Patent Office 3,165,516
Patented Jan. 12, 1965

---

3,165,516
5-SULFO AND CARBOXYPHENYL-1-(2'-CHLORO-4' - AMINO - 1':3':5' - TRIAZINYLAMINO)MONO-ANTHRAQUINONES
Hans Altermatt, Reinach, Basel-Land, Switzerland, assignor to Ciba Limited, Basel, Switzerland, a company of Switzerland
No Drawing. Filed Oct. 24, 1961, Ser. No. 147,140
Claims priority, application Switzerland, Oct. 28, 1960, 12,112/60; Apr. 24, 1961, 4,783/61
5 Claims. (Cl. 260—249)

The present invention provides valuable new acyl-amino-anthraquinones containing a hydrocarbon radical which may be substituted and which is bound through a sulfur atom, and also containing a labile substituent i.e. a substituent which can be split off easily and a water-solubilizing group, which may, if desired, be the same or different from the substituent which can be split off easily. Above all the present invention provides such α- and β-acylamino monoanthraquinones which contain in at least one further α- or β-position an arylsulfone or preferably an arylmercapto group of the benzene series or of the naphthalene series.

The dyestuffs of the invention may be obtained, for example, by acylation and simultaneous, prior or subsequent introduction of the substituent capable of being split off and of the water-solubilizing substituent. Thus, for example, the amino group in an amino-anthraquinone, containing an alkyl, cycloalkyl, aralkyl or aryl group bound through a sulfur atom, is acylated by means of an acylating agent which contains a substituent capable of being split off. This substituent must also be a water-solubilizing substituent, should there be no such water-solubilizing substituent already present.

As acylatable aminoanthraquinones, which contain a hydrocarbon radical which may be substituted and which is bound through a sulfur atom, and which may be used in the process as starting materials, there may be mentioned those containing a 9:10-dioxoanthracene ring comprising only three consecutively condensed rings, such as 2-aminoanthraquinones or above all 1-aminoanthraquinones which contain a monoalkylated or especially a free $NH_2$ group and, for example, contain in the 3-, 4-, 5-, 6-, 7- or 8-position an alkylmercapto-, alkanesulfonyl-, arylsulfonyl- or above all an arylmercapto group which, if desired, may contain water-solubilizing groups. As such compounds there may, for example, be mentioned:

1-amino-(4'-methyl- or 4'-chloromethylphenylmercapto)-anthraquinone,
1-amino-5-(4'-methyl- or 3'-chlorophenylmercapto)-anthraquinone,
1-methylamino-4-(4'-chloromethyl-phenylmercapto)-anthraquinone,
1:4-diamino-2:3-di-(phenylmercapto)-anthraquinone,
1-amino-4-phenylmercapto-anthraquinone,
2-amino-6-phenylmercapto-anthraquinone,
1-amino-5-phenylmercapto-anthraquinone,
1-amino-6-phenylmercapto-anthraquinone,
1-amino-8-phenylmercapto-anthraquinone,
1-amino-7-phenylmercapto-anthraquinone,
1-amino-4- or 5-(α- or β-naphthylmercapto)-anthraquinone,
1-amino-4- or 5-[8'-chloronaphthyl-(1')-mercapto]-anthraquinone,
1:5-diamino-4-phenylmercapto-anthraquinone,
1:4-diamino-5-phenylmercapto-anthraquinone,
1:5-diamino-4:8-diphenylmercapto-anthraquinone or the corresponding derivatives with sulfonic acid groups in the phenylmercapto radicals such as 1-amino-4-, 5- or 8-phenylmercapto-anthraquinone-3'- or 4'-sulfonic acid as well as 1-amino-4-, 5- or 8-phenylmercapto-anthraquinone-2'-carboxylic acid. The last mentioned compounds may be acylated by means of an acylating agent containing a non-water-solubilizing substituent which can be split off.

Suitable acylating agents for the above-mentioned process are those which contain a substituent capable of being split off and, where the anthraquinone derivative used as starting material is not water-soluble, also contain a water-solubilizing substituent. As acylating agents containing a substituent capable of being split off there may, for example, be mentioned those which contain a reactive substituent, that is to say those which are capable of forming a chemical bond with the cellulose, or which enable the dyestuff to undergo a reaction with itself. Suitable reactive substituents of the above-mentioned type are for example aliphatically bound ester groupings such, for example, as an aliphatically bound sulfuric acid semi-ester group such as the HO—$SO_2$—O— group or the HO—$SO_2$—S— group and halogen atoms, and especially an aliphatically bound chlorine atom. These labile substituents are suitable present in the γ- or β-position of an aliphatic radical, for example in an acetyl group, or in β-position of a propionyl group, of a crotonyl group, of a sulfonic acid alkylamide group, or above all in a heterocyclic radical especially such a radical containing two or three nitrogen atoms in a 6-membered ring, for example in a pyrimidine or pyridazine ring or above all in a triazine ring.

Suitable acylating agents which may be used as starting materials in one method of carrying out the present process are, therefore, compounds having at least two reactive positions, of which one reacts with the amino group of the aminomonoanthraquinone that is to be acylated, and another is available for further reactions of the reactive vat dyestuffs obtained. As such acylating agents there are suitable halogenated heterocyclic and acid-halide or anhydride compounds which contain one or several substituents which are capable of being split off and/or are capable of undergoing reaction, in addition to the acid halide or anhydride grouping. As examples of these there may be mentioned the following compounds:

Cyammeluric acid chloride or bromide, cyanuric acid chloride and the monocondensation products thereof with alcohols, phenols, mercaptans, ammonia or amines especially sulfoarylamines with or without a dyestuff characteristic, 2:4:6-trichloropyrimidine, 2:4:6-tribromopyrimidine, 2:4:5:6-tetrachloropyrimidine, 2:4 - dichloro-6-methylpyrimidine, 2:4-dichloro-5-nitropyrimidine, 2:4-dichloro-5-nitro-6-methylpyrimidine, 2:4:6 - trichloro - 5 - nitropyrimidine, 2:6-dichloropyrimidine-4-carboxylic acid chloride, 2:6-dichloropyrimdine-5-sulfonic acid chloride, 2:4-dichloropyrimidine-5-sulfonic acid, 2-(3'- or 4'-carboxyphenylamino)-4:6-dichloro pyrimidine, 2-(3'-or 4'-carboxyphenylamino) - 4:6:5 - trichloropyrimidine or a compound of the formula

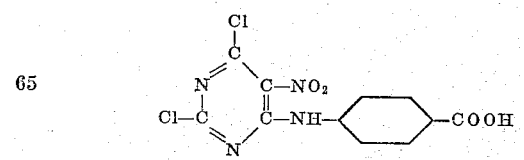

and

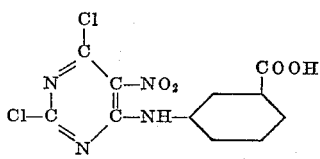

or tetrachloropyridazine, β-chloropropionic acid halides, α:β-dichloro- or dibromopropionic acid anhydride, α:β-dichloro or dibromopropionic acid chloride or the acid halides, acid anhydrides or halogenated hetero-cylic compounds which contain a group of the formula

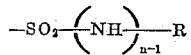

in which $n=1$ or 2 and R is a β-halogenalkyl group or a sulfonylated hydroxyalkyl group, in which the aliphatic chain may be interrupted by hetero atoms. By sulfonylated hydroxyalkyl groups there are to be understood such groups that are esterified with organic sulfonic acids or especially with sulfuric acid. R is preferably a group of the formula

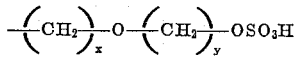

or

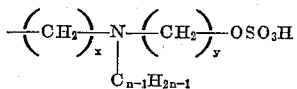

in which $n$ is a whole number and $x$ and $y$ each equal 1, 2, 3 or 4 or of the formula

or

in which Halogen is, for example, a bromine atom but especially a chlorine atom.

As such acylating agents there may be used compounds of the formula

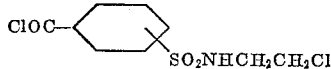

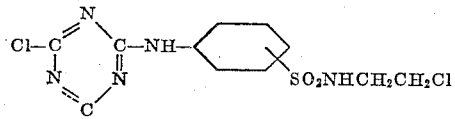

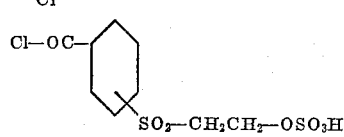

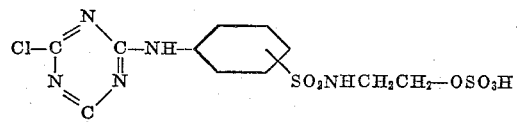

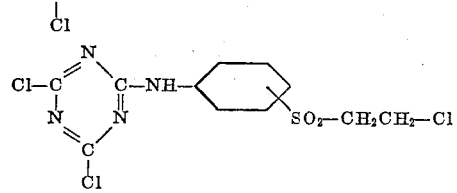

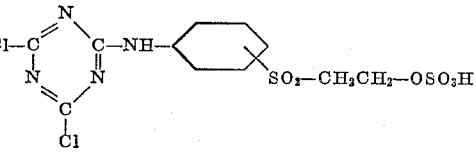

or corresponding compounds containing di- or trichloropyrimidine radicals instead of dichlorotriazine radicals. The acylation with the above-mentioned acylating agents which contain a dichlorotriazine ring may also be carried out by first reacting cyanuric acid chloride with a phenylmercaptoanthraquinone derivative containing an acylatable amino group, the two reagents being used in a colar ratio of 1:1, and then reacting the dichlorotriazine condensation product so obtained with one molecular proportion of a compound of the formula

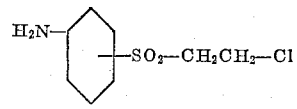

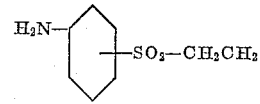

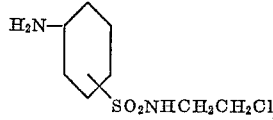

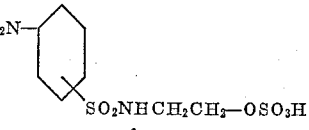

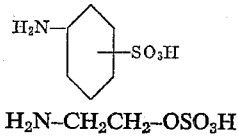

$H_2N-CH_2CH_2-OSO_3H$ or

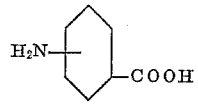

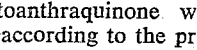

The reaction of the above-mentione acylating agent with the phenylmercaptoanthraquinone which contains an amino group may, according to the present invention, be carried out in an inert organic solvent such, for example, as nitrobenzene, chlorobenzene, or ortho-dichlorobenzene, at a raised temperature. In many cases, however, it is advantageous to carry out the reaction in aqueous medium, advantageously in the presence of an acid binding agent, such, for example, as sodium acetate, sodium hydroxide or sodium carbonate. The molecular ratio of the reactants is so chosen that for each acylatable amino group in the anthraquinone which is to be condensed, at least so much of the particular acylating agent is used that water-soluble and reactive derivatives, that is to say, anthraquinone vat dyestuffs, are obtained which contain a reactive substituent that forms a covalent linkage with the cellulose, or contain a water-solubilizing group capable of being split off.

According to a modification of the process, an amino anthraquinone which is already acylated is used, and which also contains an alkyl or aryl group bound through a sulfur atom, and into which acylaminoanthraquinone a substituent which can be split off and which may be solubilizing is introduced. This may be carried out, for example, by (a) reacting a 1-acylamino, especially 1-benzoylamino-4-, -5- or 6-phenylmercaptoantrhaquinone-sulfonic acid-halide with β-chloroethylamine or with aminoethyl sulfuric acid ($H_2N-CH_2-CH_2-OSO_3H$) or a similar amine, which contains an amino group in addition to a group capable of being split off, (b) quaternizing an acylaminoanthraquinone containing an alkyl, cycloalkyl, aralkyl or aryl group bound through a sulfur atom, (c) preparing a ternary sulfonium salt of an acylaminoanthraquinone given under (b), or (d) converting a mono- or bis-chloromethyl compound of an acylaminoanthraquinone which contains a hydrocarbon radical which may be substituted and which is bound through a sulfur atom, such, for example, as 1-benzoylamino-4-(4'- or 3'-chloromethylphenylmercapto)-anthraquinone, into a soluble derivative containing a group that may be split off, by treatment with thiourea or an alkylated thiourea.

According to a further modification of the process an acylamino monoanthraquinone containing a substituent, for example, a halogen atom or a nitro group, which substituent can be exchanged for an arylmercapto group, is used as starting material. The substituent is exchanged, for example, by condensing with thiophenol or naphthylmercaptan, and the product obtained is, if desired, sulfonated.

According to yet a further modification of the process an arylmercapto monoanthraquinone-sulfonic acid-N-(hydroxy-alkyl)-amide which contains an acylamino group in the anthraquinone nucleus, is esterified with concentrated sulfuric acid or with chlorosulfonic acid on the hydroxyl group.

The acylaminoanthraquinones of the invention which contain a substituent which is water-solubilizing and a substituent which is capable of being split off, and also contain a substituted or unsubstituted hydrocarbon radical which is bound through a sulfur atom, are suitable for dyeing a variety of materials such as artificial or natural fibers, for example cellulose ether or ester, polyester fibers (Terylene or Dacron), polyamide fibers (nylon etc.), polyacrylonitrile fibers (Orlon), polyurethane fibers as well as wool and silk, but especially for dyeing and printing textile materials of natural or regenerated cellulose in the so-called direct or exhaust dyeing process, but above all by the printing or padding process, according to which the dyestuff is fixed on to the fiber by treatment with an alkali or by heating, for example, by steaming on cellulose, so that a fast dyeing is obtained.

The dyeings and prints obtained with the use of the dyestuffs of the present invention are distinguished by their excellent fastness to light and moisture. The dyeings and prints obtained with the use of these dyestuffs which contain a reactive substituent, are also fast to dry cleaning and migration. The dyed fabrics can therefore be coated with synthetic resins, for example, polyvinyl chloride without risk of penetration of the dyestuff into the material, and this property is of importance in the manufacture of synthetic leather.

The following examples illustrate the invention. Unless otherwise indicated the parts and percentages are parts and percentages by weight. The relationship between parts by weight and parts by volume is the same as that between the gram and the milliliter.

*Example 1*

4.8 parts of 1-(para-nitrobenzoylamino)-5-phenylmercaptoanthraquinone in 300 parts by volume of dimethylformamide are reduced with Raney nickel at room temperature and under normal pressure. After hydrogenation, the reaction mixture is filtered and the filtrate treated with water until precipitation is complete. The golden - yellow 1 - (para - aminobenzoylamino) - 5-phenylmercaptoanthraquinone is filtered off, washed with water and dried.

4.5 parts of the amine so obtained are stirred in 100 parts by volume of dry nitrobenzene with 3 parts of cyanuryl chloride and 0.1 part by volume of pyridine for 15 hours at a temperature within the range of 140 to 145° C. After cooling, the precipitate is isolated, washed with a small amount of nitrobenzene and then suspended in 100 parts by volume of nitrobenzene. Gaseous ammonia is passed through the suspension at 100° C. for 1½ hours, the reaction mixture is then cooled and the precipitate is isolated and washed, first with a small amount of nitrobenzene and then with methanol, and finally dried at 60° C. under vacuum.

5 parts of the dyestuff so obtained are added to 35 parts by volume of oleum containing 1% of free $SO_3$, at a temperature within the range of 0 to 5° C. As soon as a neutralized sample is soluble in water, the whole is poured into ice, filtered and washed neutral with a solution of common salt. The residue is then slurried in the calculated equivalent proportion of a 1-normal solution of sodium hydroxide. The dyestuff of the formula

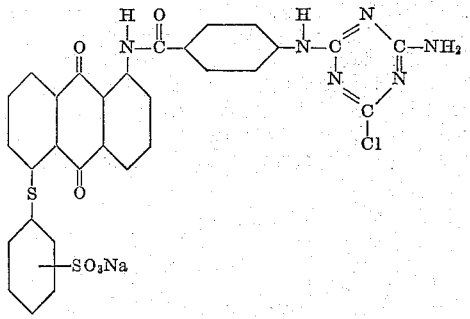

is obtained by salting out.

It dyes wool in neutral or acid dyebath yellow tints of good properties of fastness.

*Example 2*

78 parts of 1-amino-5-chloroanthraquinone are boiled in a solution of 2000 parts by volume of ethyl alcohol of 96% strength, 75 parts of sodium hydroxide and 51 parts of meta-carboxythiophenol for 24 hours under reflux. After cooling, it is poured into 8000 parts of water, filtered and the filtrate is then weakly acidified with hydrochloric acid in the ratio of 1:1. The yellow-brown precipitate so obtained is filtered off and washed with water until the washings are neutral.

3.75 parts of the 1-amino-5-(2'-carboxyphenylmercapto)-anthraquinone so obtained are dissolved in 100 parts of dry nitrobenzene at 140° C. 3 parts of cyanuryl chloride dissolved in 20 parts of nitrobenzene are added to the solution. 0.1 part of pyridine is then added, and the red solution so obtained is kept for 6 hours at a temperature within the range of 140 to 150° C., whereupon a strong HCl-formation is obtained. The condensation product formed is isolated at room temperature by filtration.

The filter cake, still moist with nitrobenzene, is dissolved in 100 parts of dry nitrobenzene at 150° C., and then, at 100° C., a moderate stream of gaseous ammonia is blown through for 1½ hours. The dyestuff that probably has the formula

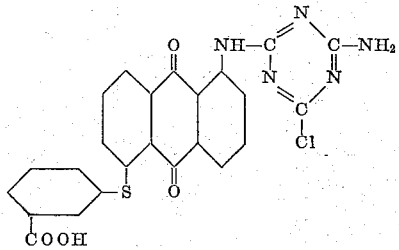

precipitates from the solution as yellow leaflets, and is isolated by filtration.

This dyestuff dyes cotton by the dyeing process described in the following paragraph, yellow tints.

2 parts of the above-mentioned dyestuff are dissolved in 100 parts of water by boiling therein for a short time. The stock solution so obtained is added to 2900 parts of water at 20° C. After the addition of 30 parts of trisodium phosphate and 60 parts of sodium chloride, 100 parts of cotton are added, the temperature is raised within 45 minutes to 80° C., a further 60 parts of sodium chloride are added, and the material is dyed for a further 30 minutes at a temperature within the range of 90 to 95° C. The dyeing is then rinsed and then after-treated for 15 minutes in a solution of 2 parts of sodium carbonate and 3 parts of soap in 1000 parts of water, at the boiling point, then rinsed and finally dried. A yellow dyeing is obtained.

*Example 3*

5 parts of 1-amino-5-phenylmercaptoanthraquinone are stirred in 15 parts by volume of oleum containing 5% of free CO$_3$, for 10 minutes at a temperature within the range of 100 to 105° C. After cooling, it is poured into 400 parts of ice and 30 parts by volume of a normal solution of sodium hydroxide. The precipitated sodium salt is filtered and washed with a solution of common salt of 20% strength until the washings are neutral. The sulfonated product so obtained is exceedingly soluble in water and probably corresponds to the formula

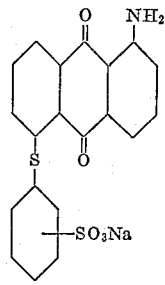

4.4 parts of this 1-amino-5-phenylmercaptoanthraquinone-x'-sulfonic acid are dissolved with heating, as the sodium salt thereof, in 200 parts of water, the pH-value of the red solution being maintained at 7.0. After cooling to a temperature within the range of 0 to 4° C. a suspension of 1.9 parts of cyanuryl chloride, which has previously been dissolved in 20 parts of acetone and then suspended in 50 parts of ice, is added.

The condensation is maintained at a pH-value within the range of 6 to 7 by the dropwise addition of 10 parts of a normal solution of sodium hydroxide, during which the temperature should not exceed 4° C. After 7 hours, the sodium hydroxide solution has all been used, and then 7.5 parts of a 2-normal solution of ammonia are added. By slowly heating the mixture to 40° C., the pH-value of about 10 eventually falls. As soon as a pH-value of 8 is obtained, a further 7.5 parts of 2-normal ammonia are added. Owing to the buffering action of the ammonium chloride formed in the reaction, the pH-value does not again rise above 9.

The yellow-orange dyestuff so obtained has the formula

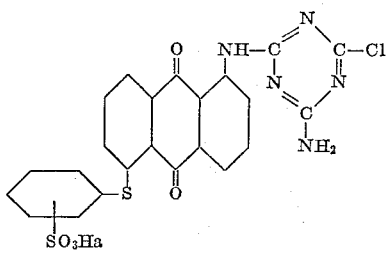

and is quantitatively isolated from the aqueous solution by the addition of a solution of common salt of 20% strength, and finally dried at a temperature within the range of 60 to 70° C.

This dyestuff dyes cotton by the dyeing process given in the last paragraph of Example 2, yellow tints of good properties of fastness.

*Example 4*

5 parts of 1-amino-5-phenylmercaptoanthraquinone are stirred in 50 parts by volume of oleum containing 5% of free SO$_3$, for 10 minutes, at a temperature within the range of 20 to 30° C. After cooling the mixture is poured into 400 parts of ice and 50 parts by volume of a normal solution of sodium hydroxide. The precipitated sodium salt is isolated by filtration and then washed with an aqueous solution of sodium chloride of 20% strength until the product has a neutral reaction.

8.6 parts of the derivative of the formula so

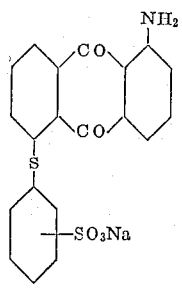

obtained are stirred in 150 parts by volume of boiling dimethylformamide, under reflux. A solution of 7 parts of para-nitrobenzoylchloride in 50 parts by volume of nitrobenzene are then added dropwise, and the mixture is then stirred at the boil under reflux, for a further 1½ hours. After cooling, 20 parts by volume of methyl alcohol are added and the reaction mixture is clarified by filtration. The filtrate is concentrated under vacuum, and the crystallized golden yellow sodium -1-4'-nitrobenzoylamino) - 5 - phenylmercaptoanthraquinone sulfonate of the formula

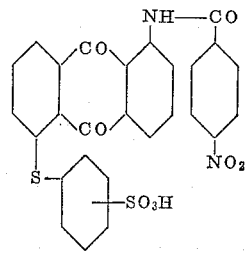

so obtained is isolated by filtration and then washed with acetone.

5.8 parts of this product are hydrogenated at room temperature under normal pressure, in 100 parts of dimethylformamide, in the presence of Raney nickel. After the reduction, the mixture is clarified by filtration and the filtrate is evaporated to dryness.

5.5 parts of the amine of the formula

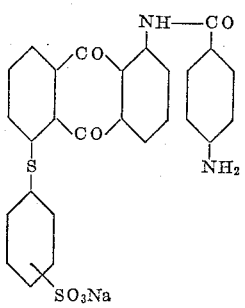

so obtained are dissolved in 200 parts of water by warming and then condensed with 1.9 parts of cyanuryl chloride in the manner described in Example 3. The condensation time taken is 30 minutes. It is then further condensed with 2 x 7.5 parts of a 2-normal solution of ammonia in an analogous manner to that described in Example 3.

The dyestuff of the formula

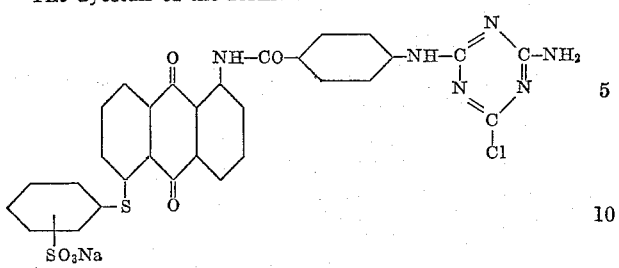

so obtained is identical with the dyestuff described in Example 1.

This dyestuff dyes cotton in the manner described in the last paragraph of Example 2 yellow tints of good properties of fastness.

Example 5

66 parts of 1-amino-5-phenylmercaptoanthraquinone and 40 parts of cyanuryl chloride are stirred in 450 parts by volume of dry nitrobenzene containing 0.5 part of pyridine, for 2 hours at 160° C. After cooling, the yellow dyestuff of the formula

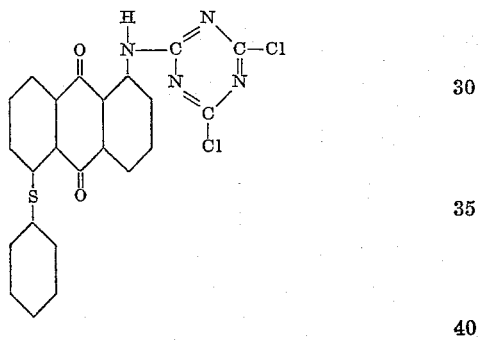

is isolated by filtration, thoroughly washed with methanol and finally dried.

10 parts of the above dyestuff are added to 75 parts by volume of oleum containing 1% of free $SO_3$, at a temperature within the range of 0 to 4° C. After ½ hour, the mixture is poured into 400 parts of ice. The sulfonic acid is filtered, washed neutral with a dilute aqueous solution of common salt and then slurried in the calculated equivalent proportion of a dilute solution of sodium carbonate. The dyestuff can be isolated by salting out and it dyes wool in neutral and in weakly acidic baths yellow tints.

What is claimed is:

1. 5 - sulfophenylmercapto-1-(2'-chloro-4'-amino-1':3': 5'-triazinylamino) monoanthraquinone.

2. 5-carboxyphenylmercapto - 1-(2'-chloro-4'-amino - 1':3':5'-triazinylamino) monoanthraquinone.

3. The dyestuff of the formula

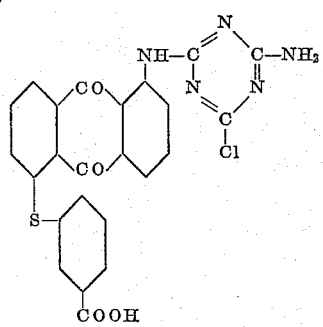

4. The dyestuff of the formula

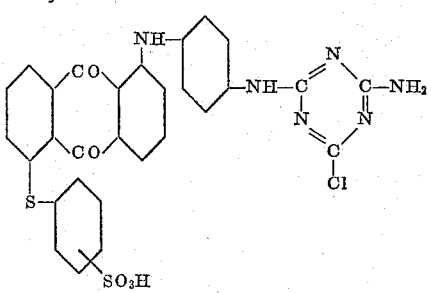

5. The dyestuff of the formula

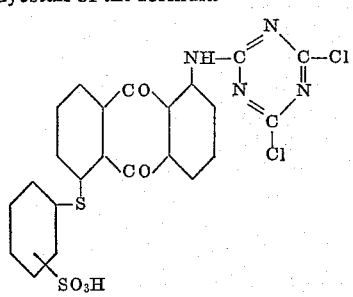

References Cited in the file of this patent
UNITED STATES PATENTS

| | | |
|---|---|---|
| 2,002,264 | Hauser et al. | May 21, 1935 |
| 2,892,670 | Alsberg et al. | June 30, 1959 |
| 2,978,289 | Barker et al. | Apr. 4, 1961 |
| 2,985,656 | Weber | May 23, 1961 |
| 3,018,154 | Downey et al. | Jan. 23, 1962 |

FOREIGN PATENTS

| | | |
|---|---|---|
| 402,741 | France | Sept. 7, 1909 |
| 1,229,749 | France | Mar. 28, 1960 |

OTHER REFERENCES

Venkataraman: "Synthetic Dyes," Academic Press Inc., 1962, page 864

Hess: "Nature," volume 183, pages 260–261 (1959).